United States Patent [19]

Chillis

[11] 4,426,861

[45] Jan. 24, 1984

[54] BRAKE LOCK FOR MOTORCYCLES AND THE LIKE

[76] Inventor: Robert L. Chillis, 10555 National Blvd. #203, Palms, Calif. 90034

[21] Appl. No.: 292,588

[22] Filed: Aug. 13, 1981

[51] Int. Cl.³ .................. B60R 25/02; B62H 5/04; E05B 67/22; G05G 5/00
[52] U.S. Cl. .................................. 70/39; 70/203; 70/212; 70/233; 280/289 L
[58] Field of Search .......... 70/39, 51, 53–56, 70/18, 233, 202, 203, 212; 280/289 L

[56] References Cited

U.S. PATENT DOCUMENTS

| | | | |
|---|---|---|---|
| 445,118 | 1/1891 | Krieger | 70/202 |
| 677,907 | 7/1901 | Vandeleur | 70/233 |
| 1,338,131 | 4/1920 | Hendricks | 70/39 |
| 1,566,473 | 12/1925 | Gibson | 70/51 |
| 2,700,289 | 1/1955 | Morgan | 70/53 |
| 2,716,336 | 8/1955 | Ross | 70/212 |
| 2,983,133 | 5/1961 | Hruby | 70/39 |
| 3,475,931 | 11/1969 | Foote | 70/54 |
| 3,805,564 | 4/1974 | Velardo | 70/54 X |

FOREIGN PATENT DOCUMENTS

| | | | |
|---|---|---|---|
| 82131 | 3/1920 | Austria | 70/55 |
| 8264 | of 1901 | United Kingdom | 70/54 |

*Primary Examiner*—Gary L. Smith
*Assistant Examiner*—Lloyd A. Gall
*Attorney, Agent, or Firm*—Freilich, Hornbaker, Rosen & Fernandez

[57] ABSTRACT

The present invention comprises a locking device and, more particularly, a security bracket, finding particular application for bicycles and the like with brake handles. The security bracket comprises a small U-shaped shackle and a member which is slidable thereon and a lock. In use the brake handle of the bicycle is locked by the shackle in a position which urges the brake handle toward the bike handle to thereby apply braking pressure to the bike until the shackle is unlocked.

11 Claims, 3 Drawing Figures

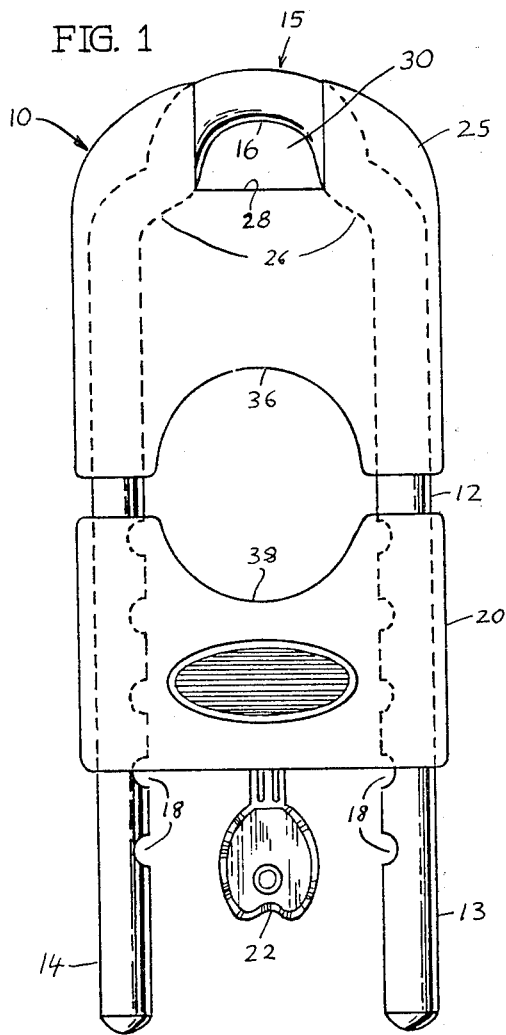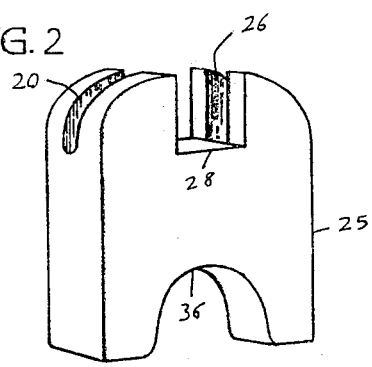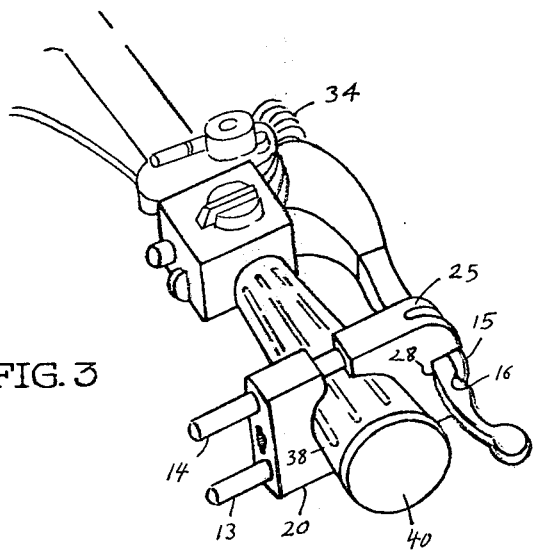

BRAKE LOCK FOR MOTORCYCLES AND THE LIKE

BACKGROUND OF THE INVENTION

Bicycles and particularly motorized bicycles hereafter referred to simply as bikes have undergone an extensive evolutionary development. From the simple small and lightweight bikes that were available a few years ago, highly sophisticated, large and relatively heavy bikes are presently available. The prices of the latter are on the order of thousands of dollars, sometimes on the order of the price of some small cars. With the increase in theft of such bikes, their owners constantly seek means for locking their bikes and thereby protect them from unauthorized removal by wrongdoers.

Various devices to lock bikes have been proposed and are being used. For example, heavy lockable chains are passed through the spokes of one of the bike's wheels. Such chains are nearly useless, since they can be cut quite easily with a pair of metal shears, and then the bike can be driven away. A bicycle lock and bracket which is described in U.S. Pat. No. 4,155,231 is used by some bike owners. The latter provides some advantage over the use of a chain. It is made of hardened steel and thus cannot be shorn off. Also, it has a security type lock which is not easily tampered with.

However, the device described in said patent has several disadvantages. First, it is quite large, on the order or 7-8 inches wide and about 18 inches long, thus creating storage problems. Unless the bike is equipped with large storage pockets, special storage arrangements must be provided. Secondly, and more importantly, although the lock and bracket is not easily removable, it has to be mounted or used in such a way that a frustrated wrongdoer can damage the bike quite seriously. The prior art lock consists of a large U-shaped shackle which in use is inserted through the spokes of one of the wheels and another structural member, e.g. a brake disk plate or a shock absorber. A bike, when so locked, can be taken off its center stand and moved back and forth several inches, in each direction, enough to cause the shackle to bend spokes and or damage the other structural members. A need therefore exists for a new improved security bracket for bikes.

OBJECTS AND SUMMARY OF THE INVENTION

The present invention, which is directed for use with bikes having a brake handle adjacent one of the bike's handles, comprises a security bracket which is designed to lock the bike by applying braking power to one of the wheels, thus inhibiting the wheel from turning. Most large sized bikes have such a brake handle, typically next to the right bike handle. The braking power, which is typically hydraulic, is applied to the front wheel. Also, large bikes have a center stand which is raised when the bike is not in use, lifting one of the bike's wheels off the ground.

The security bracket of the present invention comprises a small U-shaped shackle and a member slidable thereon and a lock. In use the bike's brake handle is inserted between the shackle top and one end of the slidable member. The lock is used to lock the shackle so that the brake handle is urged (pushed) toward the bike handle to thereby apply braking pressure, until the shackle is unlocked. By applying braking pressure, the front wheel is locked, without any devices passing through its spokes. Also, as long as braking pressure is applied, the center stand cannot be retracted. Thus, the bike for all practical purposes is immobile and cannot be moved by any wrongdoer.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front view of the novel bike bracket of the present invention;

FIG. 2 is an isometric view of a member forming part of the bike bracket; and

FIG. 3 is an isometric view showing the bike bracket as actually used on a bike.

DESCRIPTION OF THE PREFERRED EMBODIMENTS

Attention is directed to FIGS. 1-3 wherein like numerals designate like elements. Although a preferred embodiment is shown therein, it should be appreciated that variations may be made therein without departing from the spirit of the invention as claimed.

The novel bike bracket, designated by numeral 10, comprises an essentially U-shaped shackle 12. The shackle consists of two parallel legs 13 and 14. The top 15 of the shackle 12 is preferably U-shaped as represented by numeral 16 for purposes to be discussed hereafter.

The two legs 13 and 14 from near their open ends and toward the shackle top are formed with a plurality of oppositely located indentations 18. Their function is to engage a lock 20 which can be slid over the legs 13 and 14 toward the shackle top and be locked to the shackle at any selected position. A key 22 is provided to unlock the lock 20 and remove the lock off the shackle.

In addition to the foregoing, the novel bike bracket includes a member 25 which is formed with U-shaped slot 26 (See FIGS. 1 and 2). The member 25 also defines a slot 28 which extends from the members top across the U-shaped slot 26. The legs of the U-shaped slot 26 in terms of their spacings and diameter are chosen to enable the member to slide over the legs 13 and 14 of shackle 12 toward the shackle top 15. The depth and width of slot 28 are chosen so that when the member 25 is at its top position over shackle 12 an opening 30 is formed between the U-shaped top 16 and the bottom of slot 28 which is only big enough to accommodate the brake handle 32 (See FIG. 3) of a bike 34, shown only in partial view.

Preferably, at the bottom end of member 25 a substantially semicircular indentation 36 is formed. Likewise, in the preferred embodiment, the top of lock 20 is formed with a semicircular indentation 38. The purposes of these indentations is to more securely surround the bike's handle 40 when the bike bracket is used, as shown in FIG. 3.

To use the bracket, the bracket without lock 20 is first slid over the bike handle 40 and the brake handle 32. Since the member 25 is free to slide on legs 13 and 14 of the shackle 12, the bike's brake handle is easily inserted in opening 30 between the bottom of slot 28 in member 28 and the U-shaped top 16. Then the brake handle 32 is pressed toward the bike handle 40. As a result, the bike's front brakes are applied. Also, by pressing on the brake handle as member 25 engages the bike handle 40, it moves toward the top 15 of shackle 12 thereby clamping the brake handle within opening 30. Thereafter, while the brake handle 32 is still pressed toward the bike handle 40 the lock 20 is inserted over the legs 13 and 14 of the shackle 12 until its U-shaped top 38 abuts and surrounds one side of the bike handle. In this position, the lock 20 is locked.

In this position, the shackle's legs 13 and 14 remain locked in the lock. Consequently, the shackle 12 can not move to free the brake handle from moving away from the bike handle, so as to release the brakes. Thus, the brakes remain applied to the bike as long as the bracket 10 remains mounted on the bike in its locked position, as shown in FIG. 3.

To remove the bracket, the lock 20 is unlocked and slid off the legs 13 and 14 of shackle 12. The brake handle returns to its unlocked position and thereafter both the shackle 12 and member 24 are slid off of both handles 32 and 40.

Although the invention is not limited for use for the larger type bikes, its use with such bikes is particularly advantageous. As previously pointed out, in such bikes when braking power is applied by means of the bike handle 32, such as when the bracket 10 is in use, braking power is applied to the front wheel, thus inhibiting it from rolling. Also, most bike owners place their bikes when not in use on the bike's center stands. In the larger size bikes when braking power is applied by the brake handle the center stand is locked and cannot be retracted. Thus, a bike locked with the present invention cannot be rolled off its center stand, thereby further increasing the security, provided by the present invention.

Large size bikes weigh on the order of several hundred pounds, e.g. 400 pounds or more. It should thus be apparent that when a bike is locked with the present invention, it cannot be moved from its position unless it were actually lifted off the ground to clear the center stand, a task which could only be attempted by several very strong would-be wrongdoers.

Although the present invention is useful to lock different types of bikes, it is particularly useful when used on bikes with hydraulic type brakes. In such a bike, even if one were to tamper with any of the hydraulic brake lines, as long as the brake handle remains locked, i.e. urged toward the bike handle, the bike's brakes are applied.

Another advantage of the present invention is its size. Since it needs to go over only the brake handle 32 and the bike handle 40, it is relatively small in size. A bracket on the order of 2 inches wide by 7-8 inches long is more than adequate. Such a bracket can be easily stored in any small compartment. Also, its application and removal are simple and fast. In fact, once the rider stops the bike and raises it on its center stand, the bracket can be mounted to secure the bike even before the rider dismounts the bike.

Preferably, the shackle should be formed from high grade heat treated steel and should be sufficiently thick to prevent it from being cut by a bolt cutter, metal shears or hacksaw. Solid cylindrical hardened steel of less than ½ inch in diameter e.g. ⅜ or 11/52 inch was found to be quite satisfactory. In the present invention, all parts of the shackle abut other parts (see FIG. 3) Thus, even if one were to attempt to use a bolt cutter, shears or a hacksaw, the present invention makes such a task most difficult. Preferably the lock 20 shall be of the security type to prevent easy lock picking.

If desired, the top 15 of shackle 12 need not be U-shaped as shown in FIG. 1. A shackle with a flat top between legs 13 and 14 may be used. All that is necessary is that the slot 28 of member 24 be deep enough so that when member 25 is urged to the top 15 of shackle 12, the opening 30 is adequate to accommodate the brake handle 32. Also, if desired, the indentations 36 and 38 in member 25 and lock 20 may be dispensed with. In such a case, when the bracket is used, the bike handle 40 would be pressed between flat, rather than semicircular, sides of member 25 and lock 20.

It should be pointed out that if desired, the member 25 may be dispensed with. In such a case, the bracket 10 would comprise shackle 12 with a flat top 15 or one which is U-shaped as indicated by 16 in FIG. 1, and the lock 20. Even with such a bracket, the brake handle 32 can be pressed toward bike handle 40 and the shackle 12 locked by lock 20 to continue to apply braking force and thereby "lock" the bike. Since the brake handle 32 typically curves outwardly away from handle 40, it is practically impossible, to slide the locked shackle off handles 32 and 40. It is believed however, that member 25 enhances the advantages of the invention, since it facilitates the reduction of opening 30 to the minimum needed to surround the brake handle at its narrow cross section. Also, by pressing the member 25 against bike handle 40 practically eliminates the removal of the bracket, when locked, from the bike.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A locking bracket for a motor bike and the like of the type having at least one brake handle located proximately adjacent a handle of the bike and adapted to be gripped by a rider toward the bike handle to apply a braking force to at least one of the bike's wheels, the bracket comprising:

a U-shaped shackle formed with a pair of substantially parallel legs with a top end connecting said legs and an opposite open end;

a member defining a first slot, said first slot being substantially U-shaped, whereby said member is slidable on the two legs of said shackle toward the top thereof, said member defining a second slot extending downwardly from its top end, whereby when said member is in its most upward position on said shackle near the top of the shackle an opening is formed between the bottom side of said second slot and the top of said shackle, said opening being large enough to surround the bike's brake handle; and locking means slidable on the legs of said shackle, for locking said shackle on the bike, whereby said top of said shackle urges said brake handle toward said bike handle to apply braking power to said bike, and said member being pressed between the brake handle and the bike handle, with said locking means having one side pressed against said bike handle.

2. A locking bracket for a motor bike as recited in claim 1 wherein the top of said U-shaped shackle is U-shaped to accommodate the brake handle when said shackle is locked by said locking means.

3. A locking bracket for a motor bike as recited in claim 1 wherein the bike handle is substantially circular in cross section and wherein said member has one side which has a substantially semicircular indentation to surround at least part of said bike handle when said shackle is locked by said locking means.

4. A locking bracket for a motor bike as recited in claim 1 wherein the bike handle is substantially circular in cross section and wherein the side of said locking means, which is adapted to press against the bike handle when said shackle is locked, has a substantially semicircular indentation to surround at least part of said bike handle.

5. A locking bracket for a motor bike as recited in claim 4 wherein the bike handle is substantially circular in cross section and wherein said member has one side which has a substantially semicircular indentation to surround at least part of said bike handle when said shackle is locked by said locking means.

6. A locking bracket for a motor bike as recited in claim 1 wherein said legs of said shackle define a plurality of indentations for facilitating the locking of said shackle by said locking means at any one of a plurality of positions.

7. A locking bracket for a motor bike as recited in claim 6 wherein the bike handle is substantially circular in cross section and wherein said member has one side which has a substantially semicircular indentation to surround at least part of said bike handle when said shackle is locked by said locking means.

8. A locking bracket for a motor bike as recited in claim 7 wherein the bike handle is substantially circular in cross section and wherein the side of said locking means, which is adapted to press against the bike handle when said shackle is locked, has a substantially semicircular indentation to surround at least part of said bike handle.

9. A locking bracket for a motor bike as recited in claim 8 wherein the bike handle is substantially circular in cross section and wherein said member has one side which has a substantially semicircular indentation to surround at least part of said bike handle when said shackle is locked by said locking means.

10. A locking bracket for a motor bike as recited in claim 9 wherein the top of said U-shaped shackle is U-shaped to accommodate the brake handle wherein said shackle is locked by said locking means.

11. A locking bracket for a bike having at least one brake handle located adjacent one of the bike's handles, with the brake handle being adapted to be gripped and pressed toward the bike handle to apply a braking force to one of the bike's wheels, the bracket comprising:

a U-shaped shackle with two parallel legs and a top side, the top side being in contact with said brake handle and urging it toward said bike handle so as to apply a braking force when said U-shaped shackle is locked;

a lock adapted to slide over said legs of said U-shaped shackle and further adapted to press against said bike handle and lock the shackle thereto so as to urge the top of said U-shaped shackle to press said brake handle toward said bike handle; and a member which is slidable on the legs of said shackle toward the top of the latter, so that when said shackle is locked a first side of said member together with the top of said shackle define a substantially small opening, sufficient only for the brake handle to pass therethrough, and said member has a second side opposite said first side which is pressed against a portion of the bike handle, opposite the portion of the bike handle pressed by said lock.

* * * * *